(12) United States Patent
Marzorati et al.

(10) Patent No.: US 11,587,316 B2
(45) Date of Patent: Feb. 21, 2023

(54) SEGMENTING VISUAL SURROUNDING TO CREATE TEMPLATE FOR USER EXPERIENCE

(71) Applicant: KYNDRYL, INC., New York, NY (US)

(72) Inventors: Mauro Marzorati, Lutz, FL (US); Gary Francis Diamanti, Wake Forest, NC (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/345,220

(22) Filed: Jun. 11, 2021

(65) Prior Publication Data

US 2022/0398401 A1 Dec. 15, 2022

(51) Int. Cl.
*G06V 20/20* (2022.01)
*G06T 11/00* (2006.01)

(52) U.S. Cl.
CPC .............. *G06V 20/20* (2022.01); *G06T 11/00* (2013.01)

(58) Field of Classification Search
CPC ....................................................... G06F 3/011
See application file for complete search history.

(56) References Cited

U.S. PATENT DOCUMENTS

| | | | |
|---|---|---|---|
| 9,406,170 B1 | 8/2016 | Grampurohit | |
| 9,754,397 B1 | 9/2017 | Piemonte | |
| 2003/0107596 A1 | 6/2003 | Jameson | |
| 2013/0044128 A1 | 2/2013 | Liu | |

(Continued)

FOREIGN PATENT DOCUMENTS

CN 110858134 A 3/2020

(Continued)

OTHER PUBLICATIONS

Depwe et al., "Method to Provide Customization of an Application User Interface by an End User," IP.com, Original Publication Date: Jun. 1, 1988, IP.com No. IPCOM000057694D, IP.com Publication Date: Feb. 15, 2005, 2 pages.

Grasset et al., "Image-Driven View Management for Augmented Reality Browsers," IEEE International Symposium on Mixed and Augmented Reality 2012, Science and Technology Proceedings, Downloaded: Feb. 13, 2021, pp. 177-186.

(Continued)

*Primary Examiner* — Di Xiao
(74) *Attorney, Agent, or Firm* — John Kennel; Andrew M. Calderon; Calderon Safran & Cole P.C.

(57) ABSTRACT

An embodiment for creating a template for user experience by segmenting a visual surrounding is provided. The embodiment may include receiving real-time and historical data relating to one or more content interactions of a user wearing an augmented reality (AR) device. The embodiment may also include analyzing one or more contextual situations of the one or more content interactions. The embodiment may further include identifying one or more objects of interest in a visual surrounding environment of the user. The embodiment may also include in response to determining the identification of the object type is confident, predicting a contextual need for each object of interest. The embodiment may further include creating one or more information display templates. The embodiment may also include populating the one or more information display templates with information and displaying the one or more populated information display templates to the user.

20 Claims, 7 Drawing Sheets

(56) References Cited

U.S. PATENT DOCUMENTS

| | | | |
|---|---|---|---|
| 2013/0307764 A1* | 11/2013 | Denker | G06F 3/013 345/156 |
| 2013/0314441 A1 | 11/2013 | Grasset | |
| 2014/0330659 A1* | 11/2014 | Yopp | G06Q 20/322 705/16 |
| 2015/0121287 A1* | 4/2015 | Fermon | G06F 3/0304 715/773 |
| 2015/0286742 A1 | 10/2015 | Zhang | |
| 2016/0070439 A1 | 3/2016 | Bostick | |
| 2016/0350514 A1* | 12/2016 | Rajendran | G16H 20/60 |
| 2017/0039613 A1 | 2/2017 | Kaehler | |
| 2017/0052595 A1* | 2/2017 | Poulos | G06F 3/04847 |
| 2019/0302880 A1* | 10/2019 | Averyanov | G06F 3/011 |
| 2020/0034399 A1* | 1/2020 | Beno | G06F 16/9574 |
| 2020/0082576 A1* | 3/2020 | Lai | G06T 7/70 |
| 2020/0193112 A1* | 6/2020 | Pang | G06K 7/1439 |
| 2021/0039884 A1* | 2/2021 | Tosun | G06N 3/08 |
| 2021/0090449 A1* | 3/2021 | Smith | G06K 9/6254 |
| 2022/0012947 A1* | 1/2022 | Xie | G06T 19/006 |

OTHER PUBLICATIONS

O'Neill, "Creating human centered design," IBM—Watson Health Perspectives, Nov. 13, 2019, Retrieved from the Internet: https://www.ibm.com/blogs/watson-health/human-centered-design/, 4 pages.

Upadhyay et al., "Augmented Reality and Machine Learning based Product Identification in Retail using Vuforia and MobileNets," IEEE, Proceedings of the Fifth International Conference on Inventive Computation Technologies (ICICT-2020), Downloaded: Feb. 13, 2021, pp. 479-485.

Wang et al., "Hand Motion and Posture Recognition in a Network ofCalibrated Cameras," Hindawi, Advances in Multimedia, vol. 2017, Article ID 2162078, https://doi.org/10.1155/2017/2162078, 26 pages.

Mell et al., "The NIST Definition of Cloud Computing", Recommendations of the National Institute of Standards and Technology, NIST Special Publication 800-145, Sep. 2011, 7 pages.

Anonymous, "Gaze Tracking", https://github.com/antoinelame/GazeTracking, accessed Jul. 17, 2022, 6 pages.

* cited by examiner

SEGMENTING VISUAL SURROUNDING TO CREATE TEMPLATE FOR USER EXPERIENCE

BACKGROUND

The present invention relates generally to the field of computing, and more particularly to a system for creating a template for user experience by segmenting a visual surrounding.

Augmented reality (AR) devices have become popular consumer products in recent memory. These devices may include AR headsets as well as smart glasses and smart contact lenses. Such AR devices allow a user to simply gaze at their visual surroundings and display an enhanced version of that environment. For example, the user may be looking out their window on a rainy day and the AR device may display weather and/or traffic information in the direction of the user's gaze as a part of the visual surroundings. Additionally, the AR devices may recognize objects in the user's visual surroundings, such as a product in a store or an animal in a park, and display relevant information about the objects in the direction of the user's gaze, also as a part of the visual surroundings. As technology continues to improve, the demand for AR devices is expected to increase in the coming years.

SUMMARY

According to one embodiment, a method, computer system, and computer program product for creating a template for user experience by segmenting a visual surrounding is provided. The embodiment may include receiving real-time and historical data relating to one or more content interactions of a user wearing an augmented reality (AR) device. The embodiment may also include analyzing one or more contextual situations of the one or more content interactions based on the received real-time and historical data. The embodiment may further include identifying one or more objects of interest in a visual surrounding environment of the user based on the one or more content interactions of the user. An object type of each object of interest may also be identified. The embodiment may also include in response to determining the identification of the object type is confident, predicting a contextual need for each object of interest based on the one or more contextual situations and the object type. The embodiment may further include creating one or more information display templates based on the contextual need.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
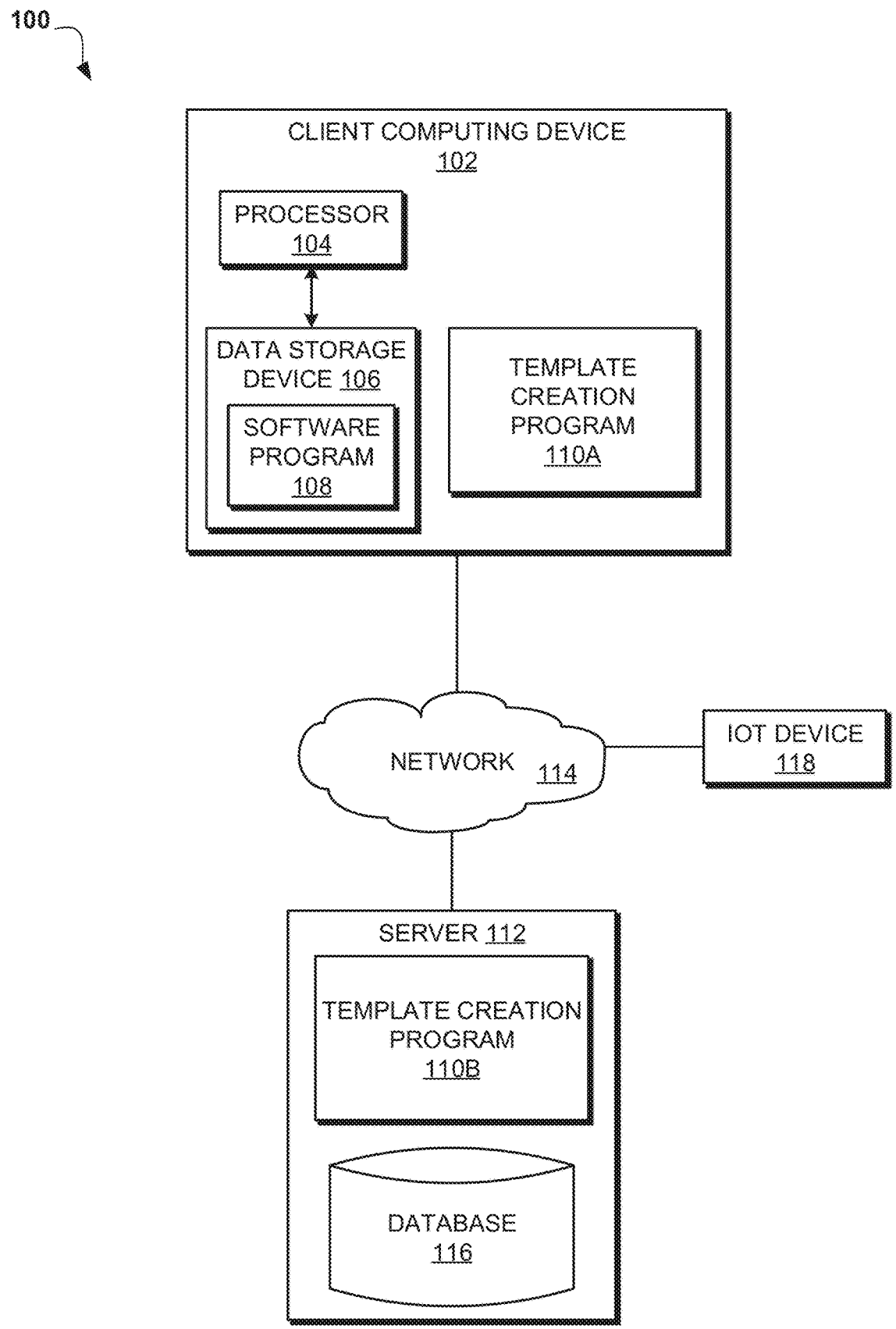
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for creating a template for user experience by segmenting a visual surrounding. The following described exemplary embodiments provide a system, method, and program product to, among other things, create an information display template based on a contextual need of a user and, accordingly, present a populated information display template to the user. Therefore, the present embodiment has the capacity to improve the technical field of augmented reality (AR) by reducing the complexity of content displayed in the visual surroundings of the user, eliminating time spent by the user in searching for desired content. Also, some embodiments of the present invention have the capacity to improve a computer by presenting to users in the AR environment a flexible and easy-to-understand graphical user interface (GUI).

As previously described, Augmented reality (AR) devices have become popular consumer products in recent memory. These devices may include AR headsets as well as smart glasses and smart contact lenses. Such AR devices allow a user to simply gaze at their visual surroundings and display an enhanced version of that environment. For example, the user may be looking out their window on a rainy day and the AR device may display weather and/or traffic information in the direction of the user's gaze as a part of the visual surroundings. Additionally, the AR devices may recognize objects in the user's visual surroundings, such as a product in a store or an animal in a park, and display relevant information about the objects in the direction of the user's gaze, also as a part of the visual surroundings. As technology continues to improve, the demand for AR devices is expected to increase in the coming years. It is often difficult for a user of an AR device to find desired content, especially when a plethora of information is presented to the user via the AR device, which may cause a delay in the response time of the user. For example, a user who wishes to purchase an object detected by the AR device may not be readily able to find an action button to buy the object. This problem is typically addressed by generating pre-defined activity templates that contain projectable patterns to guide the user through certain activities. However, pre-defined activity templates are only relevant in teaching the user how to complete tasks and fail to organize and present content based on object identification and attributes of the object. It may therefore be imperative to have a system in place to create an information display template for an AR device so that a user is able to find their desired content. Thus, embodiments of the present invention may provide advantages including, but not limited to, enabling a user to find desired content quickly, streamlining the interaction between the user and the graphical user interface (GUI) of the AR device, and learning about the interactions of the user with the displayed content in different contextual situations. The present invention does not require that all advantages need to be incorporated into every embodiment of the invention.

According to at least one embodiment, when a user is wearing an AR device, real-time and historical data relating to one or more content interactions of the user may be received. Upon receiving the real-time and historical data, one or more contextual situations of the one or more content interactions may be analyzed in order to identify one or more objects of interest in a visual surrounding environment of the user and an object type of each object of interest. In response to determining the identification of the object type is confident, a contextual need for each object of interest may be predicted based on the one or more contextual situations and the object type so that one or more information display templates may be created. Upon creating the one or more information display templates, these templates may be populated with information about the one or more identified objects of interest and the populated templates may be presented to the user via the AR device as an overlay on the visual surrounding environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create an information display template based on a contextual need of a user and, accordingly, present a populated information display template to the user.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a template creation program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a template creation program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes an AR device, such as headsets, smart glasses, smart contact lenses and/or any other AR devices known in the art for enhancing the user's visual surroundings. IoT Device 118 may also include a smart band, a smart watch, an accelerometer, a location sensor, a camera and/or microphone embedded in or external to the AR device, and/or any other IoT Device 118 known in the art for capturing a location and gestures of the user that is capable of connecting to the communication network 114, and transmitting and receiving data with the client computing device 102 and the server 112.

According to the present embodiment, the template creation program 110A, 110B may be a program capable of receiving real-time and historical data relating to the content interaction of the user, creating an information display template based on the contextual need of the user, presenting the populated information display template to the user, enabling the user to find desired content quickly, streamlining the interaction between the user and the GUI of the AR device, and learning about the interactions of the user with the displayed content in different contextual situations. The template creation method is explained in further detail below with respect to FIG. 2.

Figure 2:
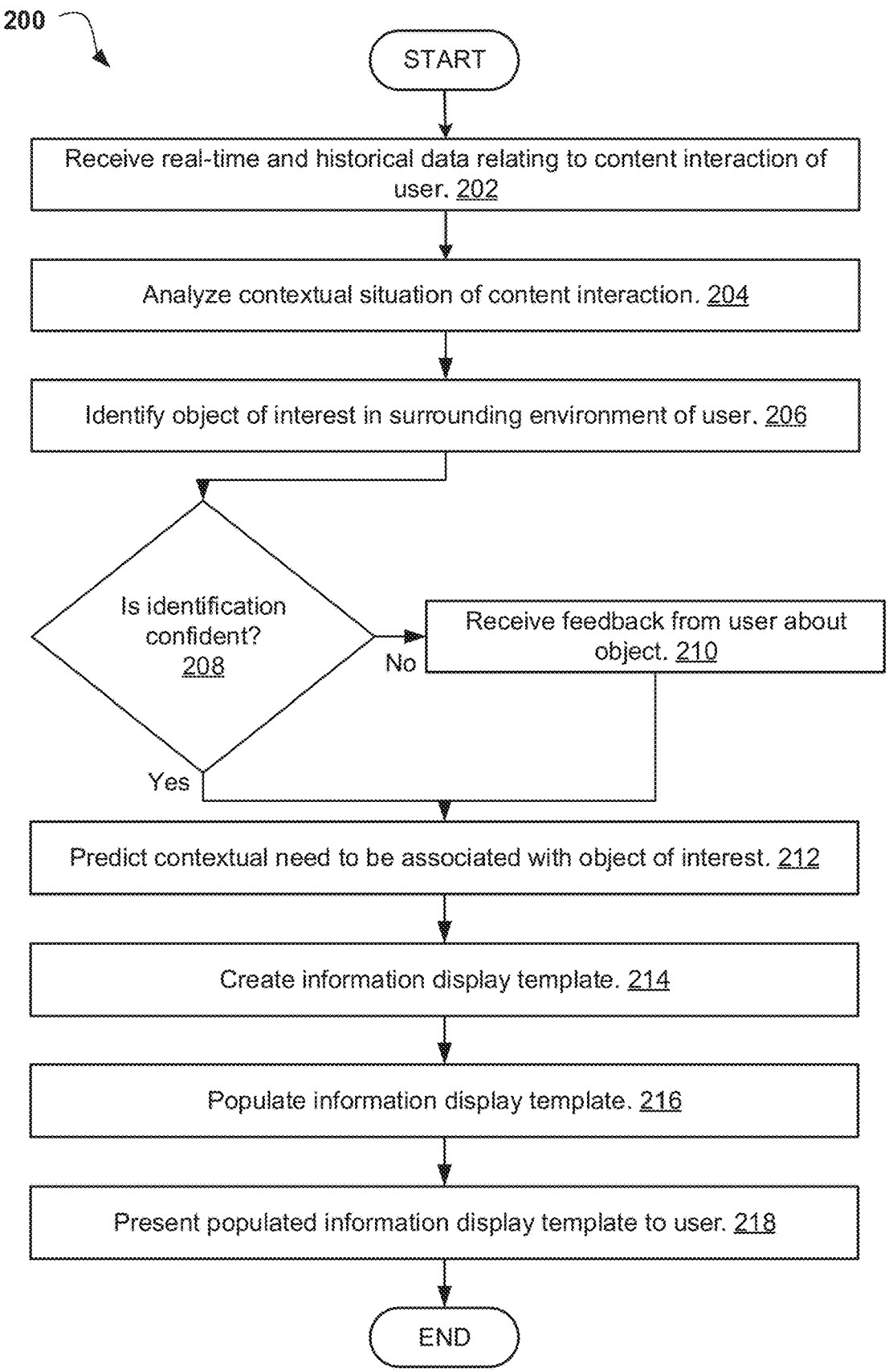
FIG. 2 illustrates an operational flowchart for creating a template for user experience by segmenting a visual surrounding in a visual surrounding segmentation and template creation process according to at least one embodiment.

Referring now to FIG. 2, an operational flowchart for creating a template for user experience by segmenting a visual surrounding in a visual surrounding segmentation and template creation process 200 is depicted according to at least one embodiment. At 202, the template creation program 110A, 110B receives real-time and historical data relating to the one or more content interactions of the user wearing an AR device. Using the software program 108 on the client computing device 102, the real-time and historical data may be received. As described above, the AR device may be an IoT Device 118 capable of connecting to the communication network 114. Examples of an AR device include, but are not limited to, headsets, smart glasses, smart contact lenses and/or any other AR devices known in the art for enhancing the user's visual surroundings. As used herein, "content interaction" means any form of interaction with overlayed digital items in the visual surrounding environment of the user that are displayed by the AR device. For example, the user may be wearing an AR headset, and the headset may be projecting digital items as an overlay within the visual surrounding environment as a part of the augmented reality. The user may interact with these digital items by repositioning them from one position in the visual surroundings to another and/or by activating an action button, illustrated below with respect to FIGS. 3 and 4. Such interactions may be captured in real-time and stored in a database, such as database 116, to facilitate machine learning (ML) about preferences of the user in different contextual situations. The analysis of contextual situations is described in further detail below with respect to step 204.

As described above, IoT Device 118 may also include a smart band, a smart watch, a location sensor, a camera and/or microphone embedded in or external to the AR device, and/or any other IoT Device 118 known in the art for capturing a location and gestures of the user that is capable of connecting to the communication network 114. Using at least one IoT Device 118, the user may interact with the overlayed digital items in a variety of different ways.

According to at least one embodiment, the user may interact with the digital items using hand gestures. For example, a wearable device, such as the smart band or the smart watch, may track the hand movements of the user and pair with the AR device so that the digital items may be reorganized. Continuing the example, the user may move their index finger back and forth, signaling an intent to activate one of the action buttons. The range of hand motions may be captured by the camera and/or wearable device (e.g., captured by an accelerometer in the smart watch) and used to select the dimensions of the digital items, described in further detail below with respect to step 214.

According to at least one other embodiment, the user may interact with the digital items using voice commands. For example, the microphone may capture the user saying, "Buy now" or "Add item to wish list," among other expressions. Continuing the example, the user may say, "Move product review template to top right corner."

According to at least one further embodiment, the user may interact with the digital items using eye gestures. The camera may capture the pupil movements of the user to activate the action button and/or reorganize the digital items. For example, the user may fix their gaze on the "Add to cart" action button for at least three seconds and then blink, indicating an intent to add a product to the cart. Continuing the example, the user may fix their gaze on one of the created templates (described in further detail below with respect to step 214) for at least three seconds and then move their pupils up and to the right, indicating an intent to move the template to the top right corner. Eye gestures are described in further detail below with respect to step 206.

Then, at 204, the template creation program 110A, 110B analyzes the one or more contextual situations of the one or more content interactions. The analysis of the one or more contextual situations is based on the received real-time and historical data. The contextual situation may include a location of the user when interacting with content (e.g., traveling and/or in a shopping complex), time of content interaction (e.g., 5 p.m. on a Friday and/or in the month of May), as well as events surrounding the user (e.g., at a sporting event or in a park). The template creation program 110A, 110B may use any IoT Device 118 described above to analyze the contextual situation. For example, the location sensor may detect the user is in a shopping center. In another example, the microphone may capture the user saying, "I'm at a sporting event." It may be appreciated that the user is able to grant permission in the settings of the AR device to monitor their speech via the microphone. The contextual situation may be used to predict the contextual need of the user, described in further detail below with respect to step 212.

Next, at 206, the template creation program 110A, 110B identifies the one or more objects of interest in the visual surrounding environment of the user. The template creation program 110A, 110B also identifies the object type of each object of interest. The one or more objects of interest are identified based on the one or more content interactions of the user described above. Examples of an object types include, but are not limited to, a food item (e.g., candy, canned goods, fruits, vegetables, and/or dinner entrees), an object found in nature (e.g., trees, bushes, and/or plants), a landmark (e.g., buildings, bridges, and/or tunnels), and/or a consumer product (e.g., detergent, computers, speakers, and/or sporting goods). The object types may be identified by a barcode or quick reference (QR) code for objects having such codes, or by using image recognition analysis for objects that do not have a barcode or QR code. For example, the AR device, via the camera, may detect a barcode on an object of interest and scan the barcode. If no barcode is detected, the AR device may perform image recognition analysis on the object using known techniques.

Whether one or more of the objects described above is an object of interest may be determined by the level of user interaction with the one or more objects in the visual surroundings of the user. For example, in the center of the field of view of the user may be one object, and in the peripheral view of the user may be another object. As described above, these objects may be presented as digital item overlays in the visual surroundings of the user. In this example, based on the field of view, the object in the center may be identified as an object of interest, and the other object in the periphery may not be identified as an object of interest. Using at least one of the hand, eye, and/or voice gestures described above, the user may position the object in the periphery next to the object in the center, indicating that the user is interested in both objects. Contrarily, the user may position the object in the periphery away from the field of view, indicating the user is not interested in that object. Using a voice command, for example, the user may say, "I am not interested in object B."

Similarly, the user may use hand motions to drag and drop objects around the field of view. While wearing the wearable device, such as the smart watch or smart band, the user may make a swiping motion with their hands moving an object toward the center which may indicate the user is interested in the object, and the user may make a swiping motion moving an object away from the center which may indicate the user is not interested in that object.

In addition to detecting hand motions via the wearable device, hand motion and hand posture recognition may also be detected using a vison-based approach in which a network of calibrated cameras segments the hand area from cluttered and moving backgrounds. The hand area may also be tracked by Kalman Filter. With the tracking results of two calibrated cameras, the 3D hand motion trajectory may be reconstructed. The trajectory may then be modeled by dynamic movement primitives and a support vector machine may be trained for trajectory recognition. Scale-invariant feature transformation may then be employed to extract features on segmented hand postures, and a gesture vector may be introduced to recognize hand gesture as an entirety which may combine the recognition results of motion trajectory and hand postures where a support vector machine is trained for gesture recognition based on gesture vectors.

The user may also use eye motions to drag and drop objects around the field of view. As described above, the camera may capture the pupil movements of the user to activate the action button and/or reorganize the digital items. For example, the user may fix their gaze on the "Add to cart" action button for at least three seconds and then blink, indicating an intent to add a product to the cart. Continuing the example, the user may fix their gaze on one of the created templates (described in further detail below with respect to step 214) for at least three seconds and then move their pupils up and to the right, indicating an intent to move the template to the top right corner.

In addition to the camera, in some embodiments a webcam-based eye tracking mechanism written in Python (2 and 3 library) may be employed by certain AR devices. For example, a more sophisticated AR device, such as a headset, may employ the webcam-based eye tracking mechanism written in Python.

Then, at 208, the template creation program 110A, 110B determines whether the identification of the object type is confident. According to at least one embodiment, the confidence threshold may be pre-configured as a default. For example, the pre-configured confidence threshold may be 50%. Thus, if the template creation program 110A, 110B identifies an object type with greater than 50% confidence, the determination may be a confident determination. According to at least one other embodiment, the confidence threshold may be customized by the user. For example, the user may raise the confidence threshold from 50% to 60%. For those objects of interest having a barcode or QR code, the template creation program 110A, 110B may identify the object type with high confidence, i.e., greater than 50%. For those objects of interest that do not have a barcode or QR code, the template creation program 110A, 110B may identify the object type with low confidence, i.e., less than or equal to 50%, depending on the conventionality of the object of interest. For example, apples in a grocery store may be identified as food with high confidence, whereas a new product on the market may require user feedback to determine the object type.

In response to determining the identification of the object type is confident (step 208, "Yes" branch), the visual surrounding segmentation and template creation process 200 proceeds to step 212 to predict the contextual need for each object of interest. In response to determining the identification of the object type for at least one of the one or more objects of interest is not confident (step 208, "No" branch), the visual surrounding segmentation and template creation process 200 proceeds to step 210 to receive feedback from the user about the object type for the at least one object of interest whose identification is not confident.

Then, at 210, the template creation program 110A, 110B receives feedback from the user about the object type for the at least one object of interest whose identification is not confident. According to at least one embodiment, the feedback may be a voice command from the user stating the object type for the at least one object of interest whose identification is not confident. For example, the template creation program 110A, 110B may prompt the user for feedback, and in response the user may audibly state, "This object is a consumer product" or "This object is a food item." The user may also be more specific in identifying an object type. For example, rather than stating, "This object is a consumer product," the user may state, "This object is a stereo." According to at least one other embodiment, the template creation program 110A, 110B may have a low confidence prediction for the object type, e.g., 30%. In such embodiments, a template may be presented to the user and the user would be able to annotate the template with the object type. Either embodiment allows for high quality labeled data for semi-supervised ML to increase the number and quality of identifiable objects in a template library.

Next, at 212, the template creation program 110A, 110B predicts the contextual need for each object of interest. The contextual need for each object of interest is based on the one or more contextual situations and the object type. As used herein, "contextual need" means the particular content the user requires in the information display template. For example, the user may wish to buy a certain object of interest, but just receive information about another object of interest. Continuing the example, the user may require the price of an object and/or different ways to buy the object.

According to at least one embodiment, voice commands of the user may be used to predict the contextual need. For example, certain sample commands may be spoken by the user, such as:

"Place order using digital assistant;"
"Ask digital assistant to place orders for products in my cart;"
"Order detergent;"
"Checkout items in my cart;"
"Add to wish list;" and
"Always show me the various forms of product reordering when I'm placing orders for canned goods, boxed foods, perishables, and frozen foods."
The above sample commands indicate the user intends to purchase an object of interest and would like to see information about prices and how to reorder these objects.

According to at least one other embodiment, the contextual situation may be used to predict the contextual need. For example, if the user is staring at a building, it may be predicted that the user would like historical information on the building. In another example, if the user is in the park and looking at a dog, the contextual need may be predicted to be information about the breed of the dog, as illustrated below with respect to FIG. 4.

According to at least one further embodiment, the object type itself may be used to predict the contextual need. For example, if the object type is a consumer product, it may be predicted that the user would like information about reviews for the product, ways to purchase the product, and prices for the product. Contrarily, if the object type is a landmark, it may be predicted that the user would like historical information about the landmark, and the information display templates may not include action buttons and product reviews.

Then, at 214, the template creation program 110A, 110B creates the one or more information display templates. The one or more information display templates may be created based on the contextual need. Types of information included in the templates are illustrated below with respect to FIGS. 3 and 4. The template creation program 110A, 110B may be historically analyzing the object interactions of the user in different contextual situations and creates templates accordingly, which may then be stored and populated for future use. One or more variables may also be analyzed and stored regarding the objects of interest, such as when the user purchased the object (e.g., 5 p.m. on Monday), where the user purchased the object (e.g., at the supermarket), how the user purchased the object (e.g., via online shopping cart), the quantity of the object that the user has at home (e.g., five candy bars or one bottle of detergent), and why the user purchased the object (e.g., via voice command, the user states, "I'm low on detergent"). In some embodiments, the templates may be created with customized dimensions for each user. For example, the dimensions of the created templates may be determined based on the hand movement range and the focus range of the user, and the appropriate dimensions to use may also be stored for future use. For example, a user who has a wide focus range and hand movement range may require a template with larger dimensions than a user with a smaller focus range and hand movement range. The variables collected may then be accessed and used to populate the templates with relevant information in accordance with a current contextual situation and contextual need of the user, described in further detail below with respect to step 216. Thus, past contextual situations and needs may be used to create templates and those templates may be retrieved and populated for similar future contextual situations and needs.

Next, at 216, the template creation program 110A, 110B populates the one or more information display templates with information about the one or more identified objects of interest. The templates may be populated based on the contextual need of each object of interest. For example, when travelling and in a shopping complex, the user historically rearranges templates containing information about price and product reviews to the center of the field of view using at least one of the hand gestures, eye gestures, and voice commands described above. Thus, when the user is currently travelling and in a shopping complex, the template creation program 110A, 110B retrieves templates from the database, such as database 116, that contain information about price and product reviews and populates them with the relevant information about the product. Continuing the example, if the product is an action figure, the one or more templates may be populated with product reviews of the action figure, prices of the action figure, ways to buy the action figure, and/or similar alternative action figures. In another example, when in a market near the home of the user, the identified object of interest may be a box of cereal. The one or more variables described above may be used to infer that the user already bought a box of cereal at 5 p.m. on Monday during the previous week, and thus may not populate the template about quantity of the product the user has at home, but rather populate the template with alternative cereals. If it is not possible to buy the object of interest because the object is not for sale, such as a building, a bridge, a tree in a park, and/or a statue, the templates about product reviews, alternative products, ways to buy, and prices may not be populated. Rather, the one or more templates may be populated with historical information, such as when a building was built or when a tree was planted, and/or how many visitors travel to the landmark each year.

Then, at 218, the template creation program 110A, 110B presents the one or more populated information display templates to the user. The templates are presented via the AR device as an overlay on the visual surrounding environment, as illustrated below with respect to FIGS. 3 and 4. As described above, the object of interest itself may also be presented as an overlayed digital item within the visual surrounding environment. As described above, the populated templates may be presented to the user in accordance with the proper dimensions based on the range of hand and eye movements. Similarly, a user who is visually impaired may require a larger template, which may be configured in the settings of the AR device, regardless of their hand and eye movements. The one or more populated templates and the object of interest may be configured to be repositioned in the visual surrounding environment by the at least one of hand gestures, eye gestures, and voice commands. For example, the user may not wish to purchase an object of interest and may therefore move the action buttons, such as "Add to wishlist," "Buy now," and "Add to cart" away from the center of the field of view, toward the bottom of the screen, or out of the field of view completely. Any time the one or more populated templates are repositioned by the user, the template creation program 110A, 110B captures such repositioning and includes the information as historical data. Continuing the example, if the user moved the action buttons to the bottom of the field of view for a candy bar, the next time the user gazes at a candy bar, the action buttons may also be displayed at the bottom of the field of view. Similarly, if in the past the user bought a light bulb via a virtual assistant, the next time the user gazes at a light bulb in their home an action button displaying "Buy with digital assistant" may be presented to the user. Thus, the order in which the populated templates are displayed may be based on past and present interactions with the overlayed content.

Figure 3:
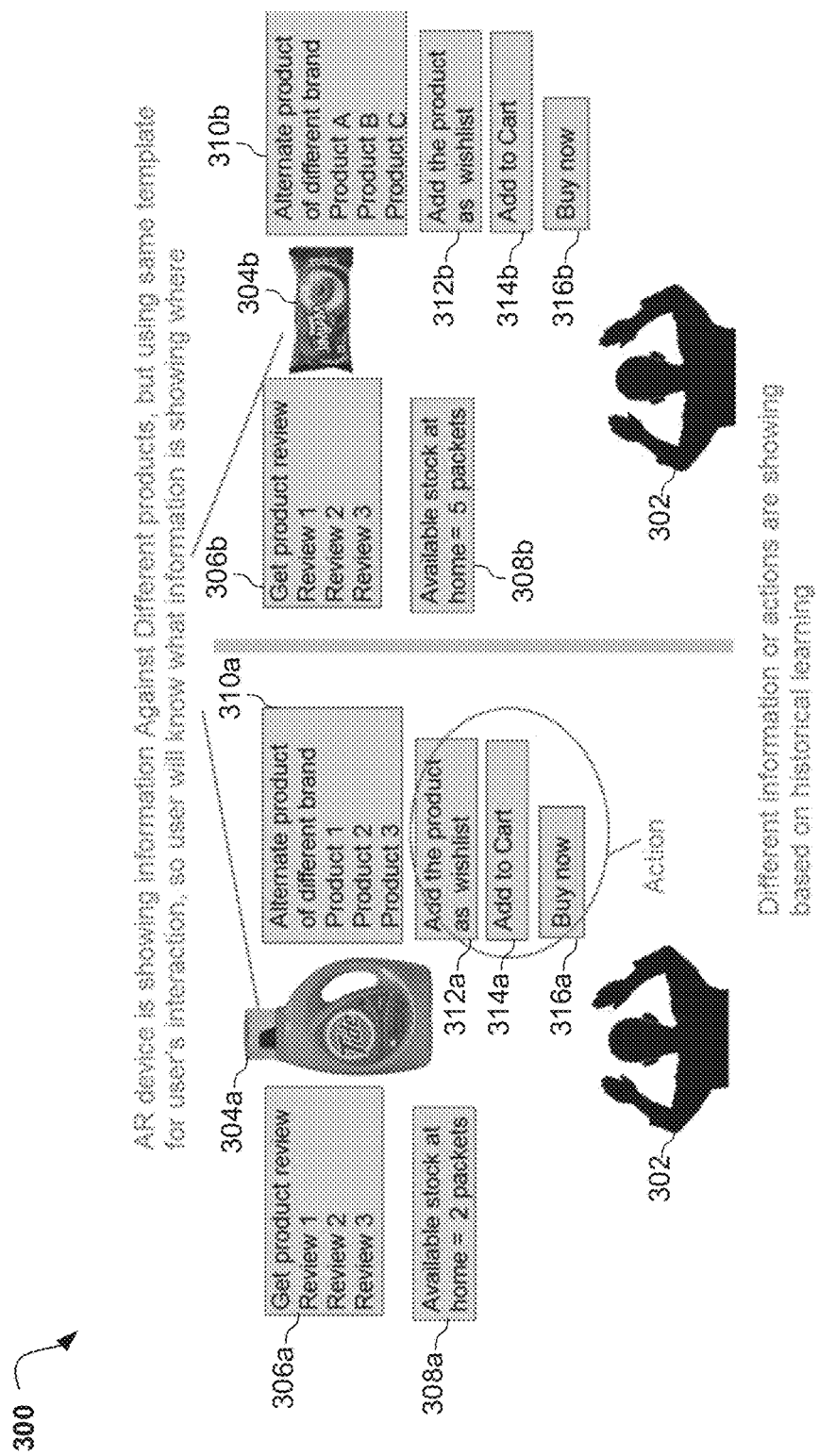
FIG. 3 is a diagram depicting created templates and exemplary content of the templates according to at least one embodiment.

Referring now to FIG. 3, a diagram 300 depicting created templates and exemplary content of the templates is shown according to at least one embodiment. The user 302 may be looking at an object of interest 304a, 304b and the object of interest 304a, 304b may be a consumer product. Thus, even though one product is a bottle of detergent 304a and the other product is candy 304b, the same templates 306a-316a and 306b-316b may be created and displayed so that the user 302 is able to quickly access the desired information. As illustrated in the diagram 300, the identified object of interest 304a, 304b may be displayed in the center of the field of view, and the one or more templates 306a-316a and 306b-316b may be in a same position for the bottle of detergent 304a and the candy 304b. For example, the "Get product review" template 306a, 306b may be displayed in the top left corner for both products 304a, 304b. The "Available stock" template 308a, 308b may be displayed at the bottom left corner. The "Alternative products" template 310a, 310b may be displayed at the top right corner. The one or more action buttons, collectively the "Add the product as wishlist" template 312a, 312b, the "Add to cart" template 314a, 314b, and the "Buy now" template 316a, 316b may be arranged toward the bottom right corner. As described above, in some embodiments the order of the templates 306a-316a and 306b-316b may be arranged in accordance with historical preference. In other embodiments the templates 306a-316a and 306b-316b may be arranged alphabetically from the top left corner to the bottom right corner. For example, the "Alternative products" template 310a, 310b may appear at the top left corner, and the "Available stock" template 308a, 308b may appear at the bottom left corner, and so on. The templates 306a-316a and 306b-316b may be categorized by object of interest 304a, 304b type and relevant information may be displayed accordingly. For example, as illustrated in exemplary diagram 300, the types of information may include: "Review 1," "Review 2," and "Review 3" for the "Get product review" template 306a, 306b; a specific quantity, e.g., "2 packets," for the "Available stock" template 308a, 308b; "Product 1," "Product 2," and "Product 3" for the "Alternative products" template 310a, 310b; as well as the action buttons.

Figure 4:
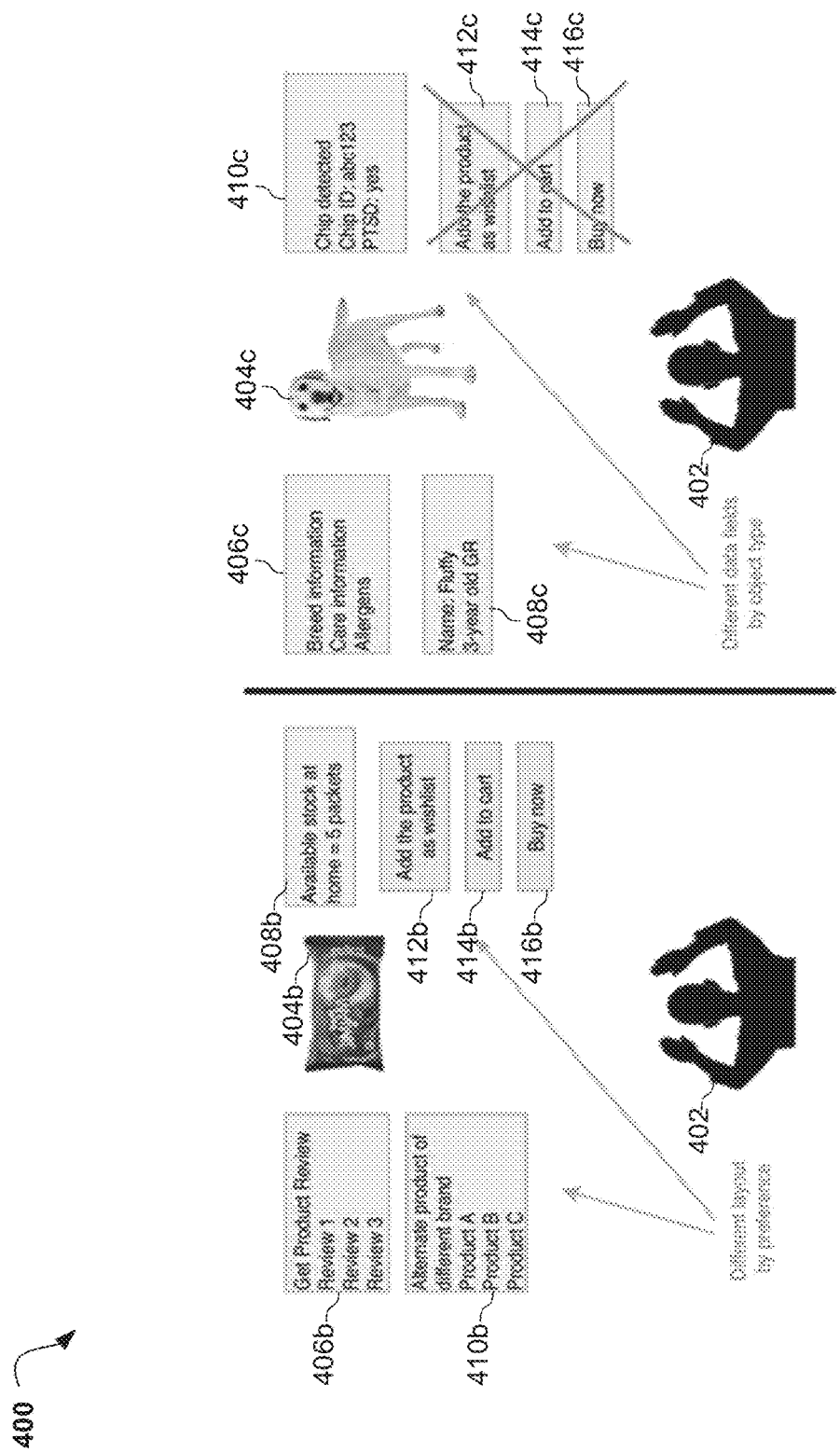
FIG. 4 is a diagram depicting different layouts and different exemplary content of the created templates in FIG. 3 according to at least one embodiment.

Referring now to FIG. 4, a diagram 400 depicting different layouts and different exemplary content of the created templates in FIG. 3 is shown according to at least one embodiment. The user 402 may be looking at an object of interest 404b, 404c of a different type. For example, the user 402 may be looking at candy 404b and a dog 404c. Thus, different templates 406b-416b and 406c-416c may be created and displayed so that the user 402 is able to quickly access the desired information. As illustrated in the diagram 400, the identified object of interest 404b, 404c may be displayed in the center of the field of view, and the templates 406b-416b for the candy 404b may display different types of information than the templates 406c-416c for the dog 404c. The templates 406b-416b and 406c-416c may also be categorized by object of interest 404b, 404c type and relevant information may be displayed accordingly. For example, as illustrated in exemplary diagram 400, the types of information may include: "Review 1," "Review 2," and "Review 3" for the "Get product review" template 406b; a specific quantity, e.g., "5 packets," for the "Available stock" template 408b; "Product 1," "Product 2," and "Product 3" for the "Alternative products" template 410b; as well as the action buttons, collectively the "Add the product as wishlist" template 412b, the "Add to cart" template 414b, and the "Buy now" template 416b. The templates 406b-416b are displayed in a different layout from the corresponding templates 306b-316b displayed in FIG. 3, based on configurable user preferences. Additionally, since the dog 404c is of a different object type than the candy 404b, it may be the case that different templates 406c-416c with different types of information are displayed for the dog 404c. For example, the types of information for the dog 404c, as opposed to the candy 404b, may include: "Care information" and "Allergens" for the "Breed information" template 406c; "Fluffy" and "3-year old GR" for the "Name and Age" template 408c; and "Chip ID:abc123" and "PTSD: yes" for the "Service dog" template 410c. Additionally, in some embodiments, the one or action buttons, collectively the "Add the product as wishlist" template 412c, the "Add to cart" template 414c, and the "Buy now" template 416c may be displayed with an "X" symbol indicating the object of interest 404c is not for sale. In other embodiments, the one or more action buttons may not be displayed at all to the user. Similarly to the embodiment described above in FIG. 3, the user may create a visual theme for some or all of the templates 406b-416b and 406c-416c. For example, the user may select a different color for the "Add the product as wishlist" template 412b, the "Add to cart" template 414b, and the "Buy now" template 416b.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
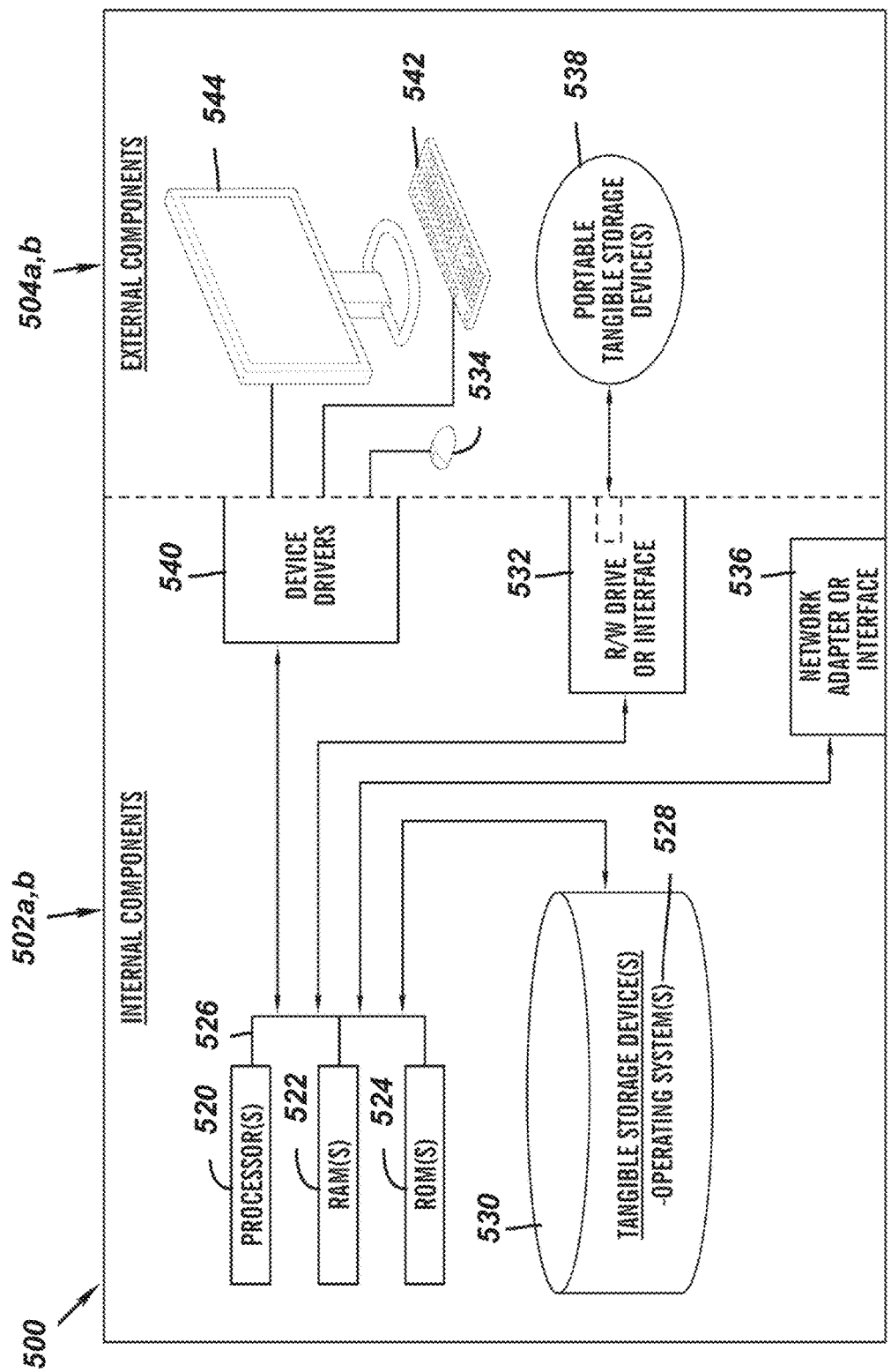
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the template creation program 110A in the client computing device 102 and the template creation program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the template creation program 110A, 110B, can be stored on one or more of the respective portable computer-readable tangible storage devices 538, read via the respective R/W drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software program 108 and the template creation program 110A in the client computing device 102 and the template creation program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the template creation program 110A in the client computing device 102 and the template creation program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
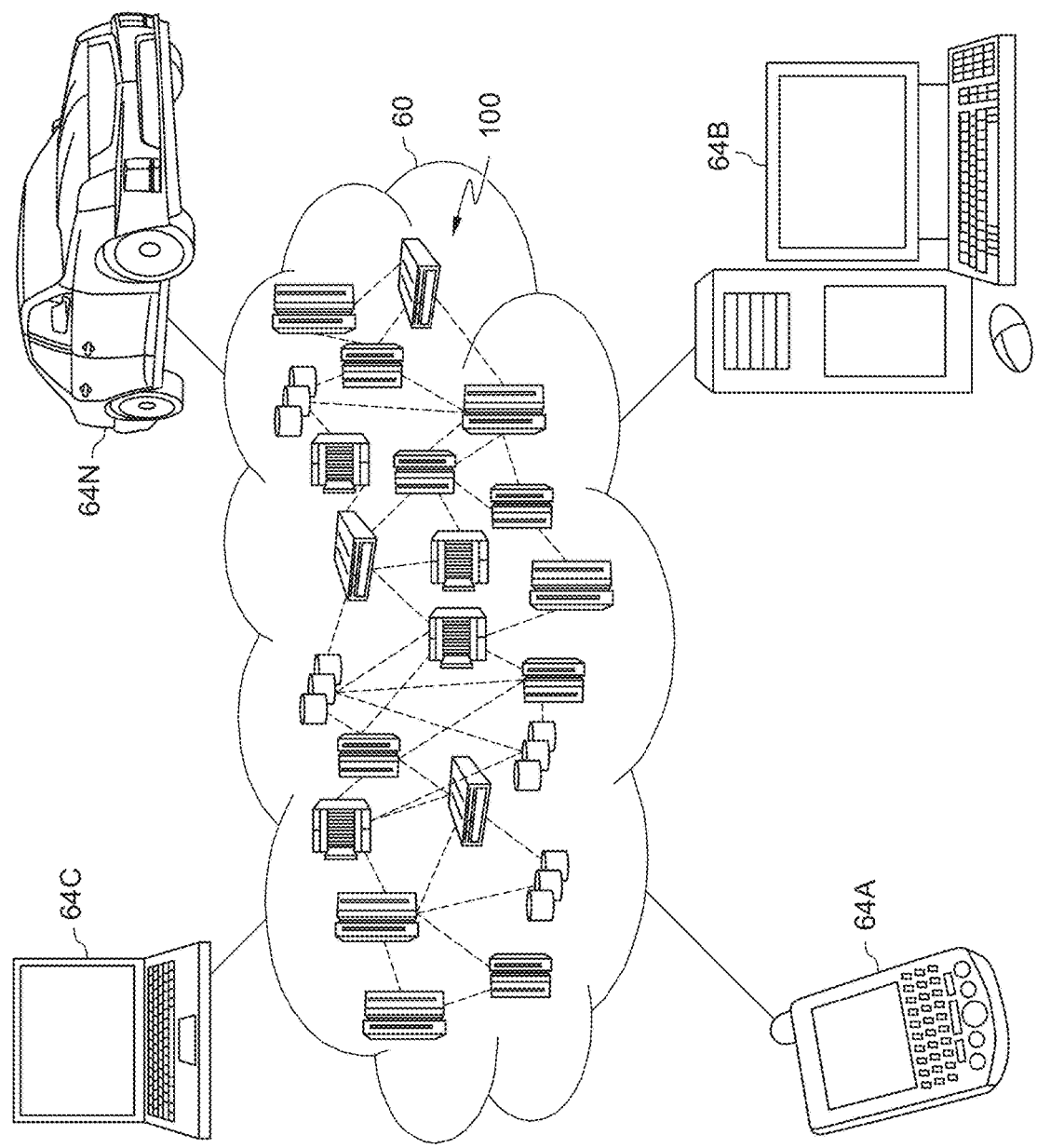
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
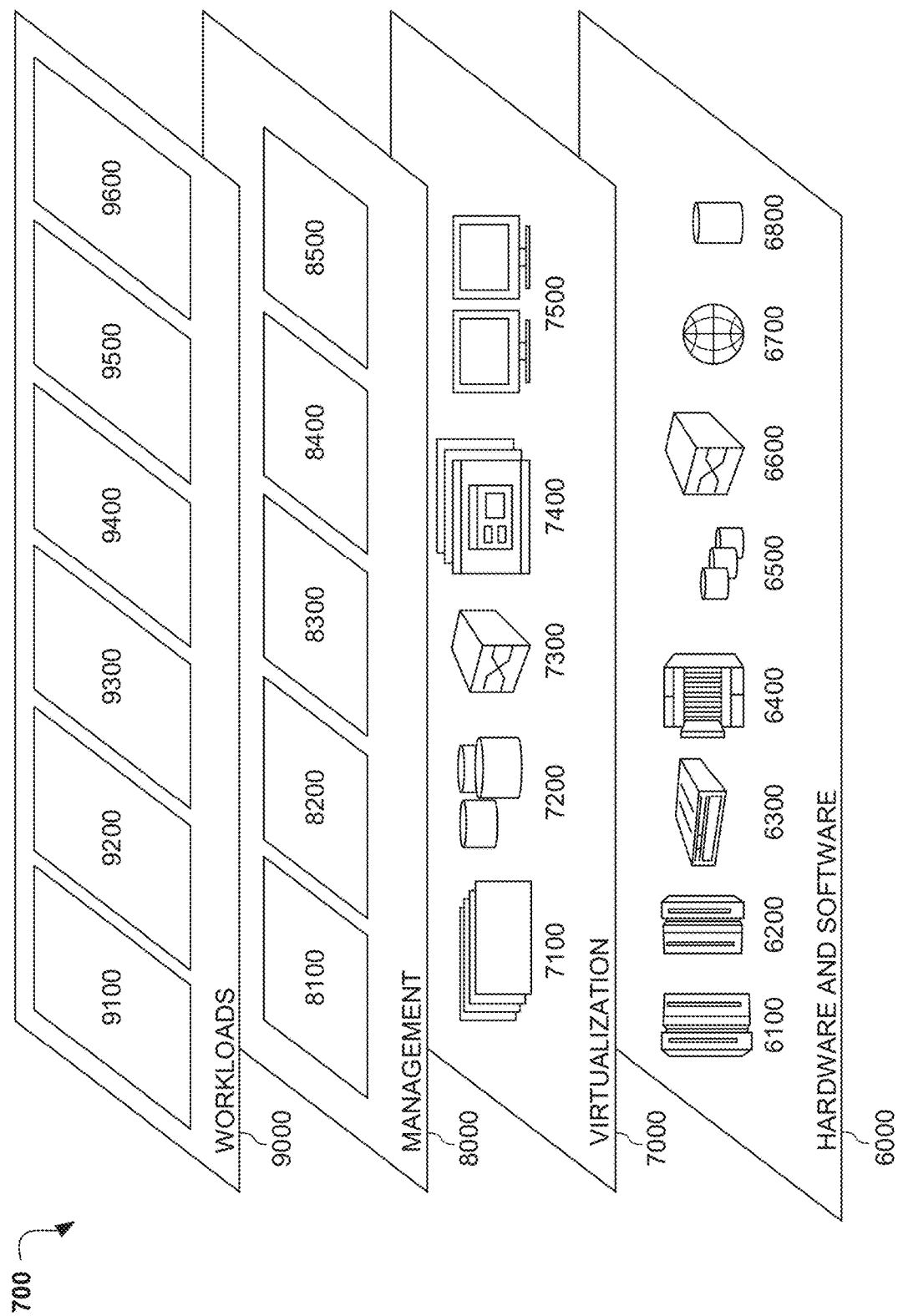
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and creating a template for user experience by segmenting a visual surrounding 9600. Creating a template for user experience by segmenting a visual surrounding 9600 may relate to creating an information display template based on a contextual need of a user in order to present a populated information display template to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of creating a template for user experience by segmenting a visual surrounding, the method comprising:
   receiving real-time and historical data relating to one or more content interactions of a user wearing an augmented reality (AR) device, wherein the content interaction comprises an interaction with one or more overlayed digital items in a visual surrounding environment of the user that are displayed by the AR device;
   analyzing one or more contextual situations of the one or more content interactions based on the received real-time and historical data, wherein the one or more contextual situations includes a time and a location of the user when interacting with the one or more overlayed digital items in the visual surrounding environment of the user that are displayed by the AR device;
   identifying one or more objects of interest in the visual surrounding environment of the user based on the one or more content interactions of the user, wherein an object type of each object of interest is identified;
   determining whether the identification of the object type is confident (using contextual situations to connect to identification);
   in response to determining the identification of the object type is confident, predicting a contextual need of particular content for each object of interest to the user based on the one or more contextual situations and the object; and
   creating one or more information display templates based on the contextual need.

2. The method of claim 1, further comprising:
   populating the one or more information display templates with information about the one or more identified objects of interest based on the contextual need of each object of interest; and
   presenting the one or more populated information display templates to the user via the AR device as an overlay on the visual surrounding environment.

3. The method of claim 2, wherein dimensions of the one or more populated information display templates presented to the user are determined based on a hand movement range and a focus range of the user.

4. The method of claim 2, wherein the one or more populated information display templates presented to the user are configured to be repositioned by the user via hand gestures, and wherein any repositioning of the one or more populated information display templates is included in the historical data.

5. The method of claim 1, further comprising:
   in response to determining the identification of the object type for at least one of the one or more objects of interest is not confident, receiving feedback from the user about the object type for the at least one object of interest whose identification is not confident.

6. The method of claim 5, wherein the feedback is a voice command from the user stating the object type for the at least one object of interest whose identification is not confident.

7. The method of claim 1, wherein if a barcode is present on at least one of the one or more objects of interest, the AR device identifies the object type for the at least one object of interest that has the barcode by scanning the barcode, and wherein if the barcode is not present on at least one of the one or more objects of interest, the AR device identifies the object type for the at least one object of interest that does not have the barcode by image recognition analysis.

8. A computer system, the computer system comprising:
   one or more processors, one or more computer-readable memories, one or more computer readable storage medium, and program instructions stored on at least one of the one or more computer readable storage medium for execution by at least one of the one or more processors via at least one of the one or more memories, wherein the computer system is capable of performing a method comprising:
receiving real-time and historical data relating to one or more content interactions of a user wearing an augmented reality (AR) device, wherein the content interaction comprises an interaction with one or more overlayed digital items in a visual surrounding environment of the user that are displayed by the AR device;
analyzing one or more contextual situations of the one or more content interactions based on the received real-time and historical data, wherein the one or more contextual situations includes a time and a location of the user when interacting with the one or more overlayed digital items in the visual surrounding environment of the user that are displayed by the AR device;
identifying one or more objects of interest in the visual surrounding environment of the user based on the one or more content interactions of the user, wherein an object type of each object of interest is identified;
determining whether the identification of the object type is confident;
in response to determining the identification of the object type is confident, predicting a contextual need of particular content for each object of interest to the user based on the one or more contextual situations and the object type; and
creating one or more information display templates based on the contextual need.

9. The computer system of claim 8, further comprising:
populating the one or more information display templates with information about the one or more identified objects of interest based on the contextual need of each object of interest; and
presenting the one or more populated information display templates to the user via the AR device as an overlay on the visual surrounding environment.

10. The computer system of claim 9, wherein dimensions of the one or more populated information display templates presented to the user are determined based on a hand movement range and a focus range of the user.

11. The computer system of claim 9, wherein the one or more populated information display templates presented to the user are configured to be repositioned by the user via hand gestures, and wherein any repositioning of the one or more populated information display templates is included in the historical data.

12. The computer system of claim 8, further comprising:
in response to determining the identification of the object type for at least one of the one or more objects of interest is not confident, receiving feedback from the user about the object type for the at least one object of interest whose identification is not confident.

13. The computer system of claim 12, wherein the feedback is a voice command from the user stating the object type for the at least one object of interest whose identification is not confident.

14. The computer system of claim 8, wherein if a barcode is present on at least one of the one or more objects of interest, the AR device identifies the object type for the at least one object of interest that has the barcode by scanning the barcode, and wherein if the barcode is not present on at least one of the one or more objects of interest, the AR device identifies the object type for the at least one object of interest that does not have the barcode by image recognition analysis.

15. A computer program product, the computer program product comprising:
one or more computer readable storage medium and program instructions stored on at least one of the one or more computer readable storage medium, the program instructions executable by a processor capable of performing a method, the method comprising:
receiving real-time and historical data relating to one or more content interactions of a user wearing an augmented reality (AR) device, wherein the content interaction comprises an interaction with one or more overlayed digital items in a visual surrounding environment of the user that are displayed by the AR device;
analyzing one or more contextual situations of the one or more content interactions based on the received real-time and historical data, wherein the one or more contextual situations includes a time and a location of the user when interacting with the one or more overlayed digital items in the visual surrounding environment of the user that are displayed by the AR device;
identifying one or more objects of interest in the visual surrounding environment of the user based on the one or more content interactions of the user, wherein an object type of each object of interest is identified;
determining whether the identification of the object type is confident;
in response to determining the identification of the object type is confident, predicting a contextual need of particular content for each object of interest to the user based on the one or more contextual situations and the object type; and
creating one or more information display templates based on the contextual need.

16. The computer program product of claim 15, further comprising:
populating the one or more information display templates with information about the one or more identified objects of interest based on the contextual need of each object of interest; and
presenting the one or more populated information display templates to the user via the AR device as an overlay on the visual surrounding environment.

17. The computer program product of claim 15, further comprising:
in response to determining the identification of the object type for at least one of the one or more objects of interest is not confident, receiving feedback from the user about the object type for the at least one object of interest whose identification is not confident.

18. The computer program product of claim 16, wherein dimensions of the one or more populated information display templates presented to the user are determined based on a hand movement range and a focus range of the user.

19. The computer program product of claim 17, wherein the feedback is a voice command from the user stating the object type for the at least one object of interest whose identification is not confident.

20. The computer program product of claim 15, wherein if a barcode is present on at least one of the one or more objects of interest, the AR device identifies the object type for the at least one object of interest that has the barcode by scanning the barcode, and wherein if the barcode is not present on at least one of the one or more objects of interest, the AR device identifies the object type for the at least one object of interest that does not have the barcode by image recognition analysis.

* * * * *